United States Patent
Herz

[11] 3,922,012
[45] Nov. 25, 1975

[54] POWER GENERATOR

[76] Inventor: Harry Herz, 1200 Hurlbut Ave., Sebastopol, Calif. 95472

[22] Filed: Feb. 28, 1974

[21] Appl. No.: 447,033

[52] U.S. Cl. .......................... 290/43; 290/54; 415/7
[51] Int. Cl.² ........................................... F03B 13/12
[58] Field of Search............ 290/42, 43, 44, 45, 53, 290/54, 55; 415/5, 7, 50, 60

[56] References Cited
UNITED STATES PATENTS

| | | | |
|---|---|---|---|
| 950,676 | 3/1910 | Price | 415/7 |
| 1,109,839 | 9/1914 | Henry | 415/7 |
| 1,646,723 | 10/1927 | Bonetto | 290/55 |
| 1,654,165 | 12/1927 | Felt | 290/55 |
| 1,811,565 | 6/1931 | Schwabacher | 290/53 |

*Primary Examiner*—G. R. Simmons
*Attorney, Agent, or Firm*—Theodore J. Bielen, Jr.

[57] ABSTRACT

The invention is concerned with a submersible power generator for converting the energy of deep ocean currents, tidal flows, river channel currents and the like to more usable forms of power such as electricity. The generator comprises a rotor having a plurality of horizontally radiating spokes mounted in common on a rotatable vertical shaft to drive the same. Each spoke has a hinged impeller blade which by its automatic positioning relative to its spoke maximizes the surface area of the blade acted on by the water current through a part of the rotor displacement and minimizes such surface area through other parts of the displacement, thereby producing the necessary asymmetrical force required to produce rotation. Torque is obtained from the water acting against each blade throughout more than 180° of its arcuate travel around the axis of the shaft as a result of a specialized orientation enforced on each blade by stop pieces engaged by the blade adjacent the end of its downstream power stroke. The immense structures required to extend the full depth of ocean channels are made possible by the feature of the blades being hollow and sized to create sufficient buoyancy to create a neutral floating body resulting in greatly reduced support structure requirements. The apparatus includes hollow pontoons for floatation and easy towing to an installation site followed by flooding of the pontoons and subsequent sinking of the apparatus into position on the ocean floor. The submerged pontoons have adjustable braces attached thereto so that the apparatus may be placed in a stable position on an uneven ocean bottom.

12 Claims, 6 Drawing Figures

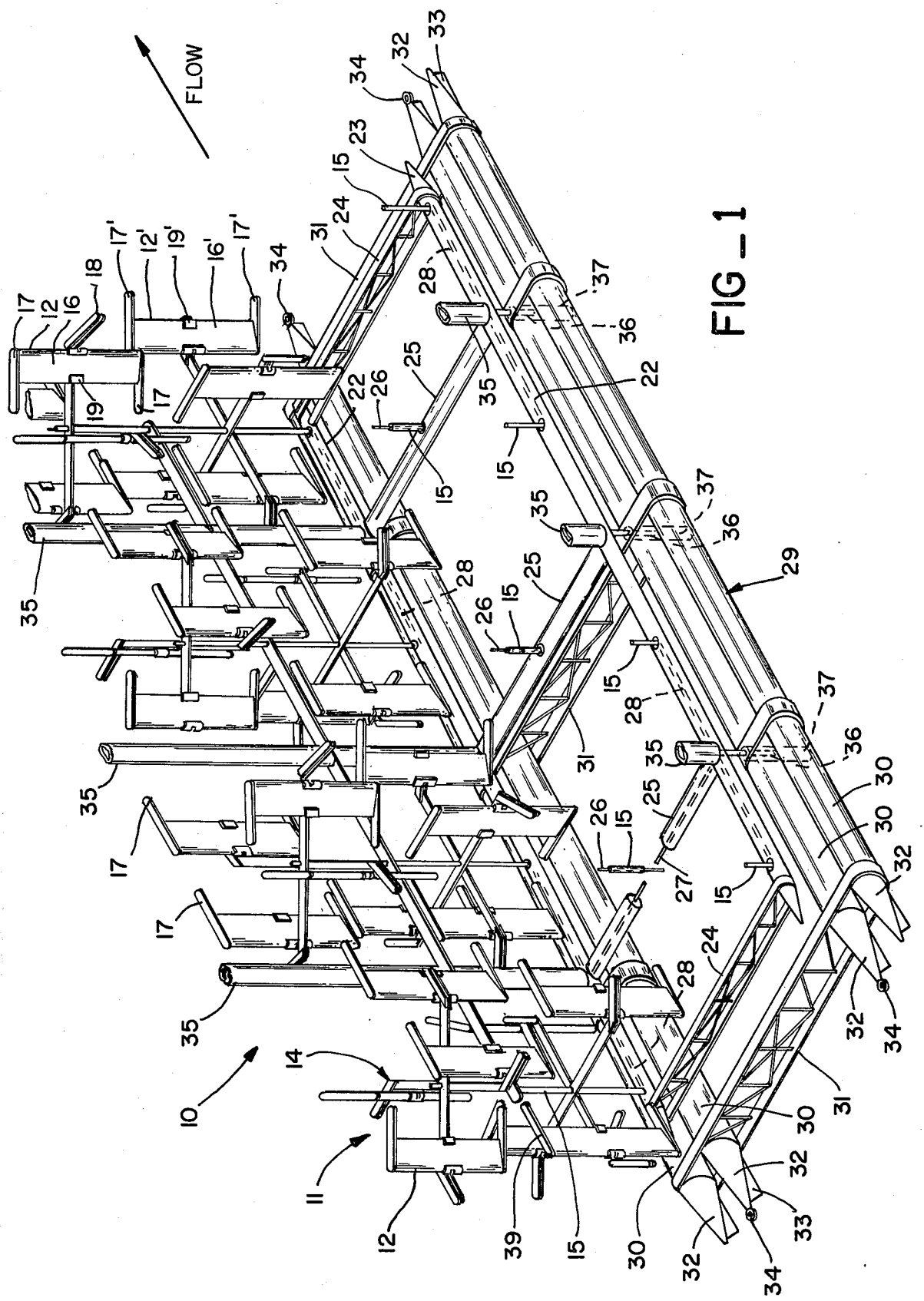
FIG_1

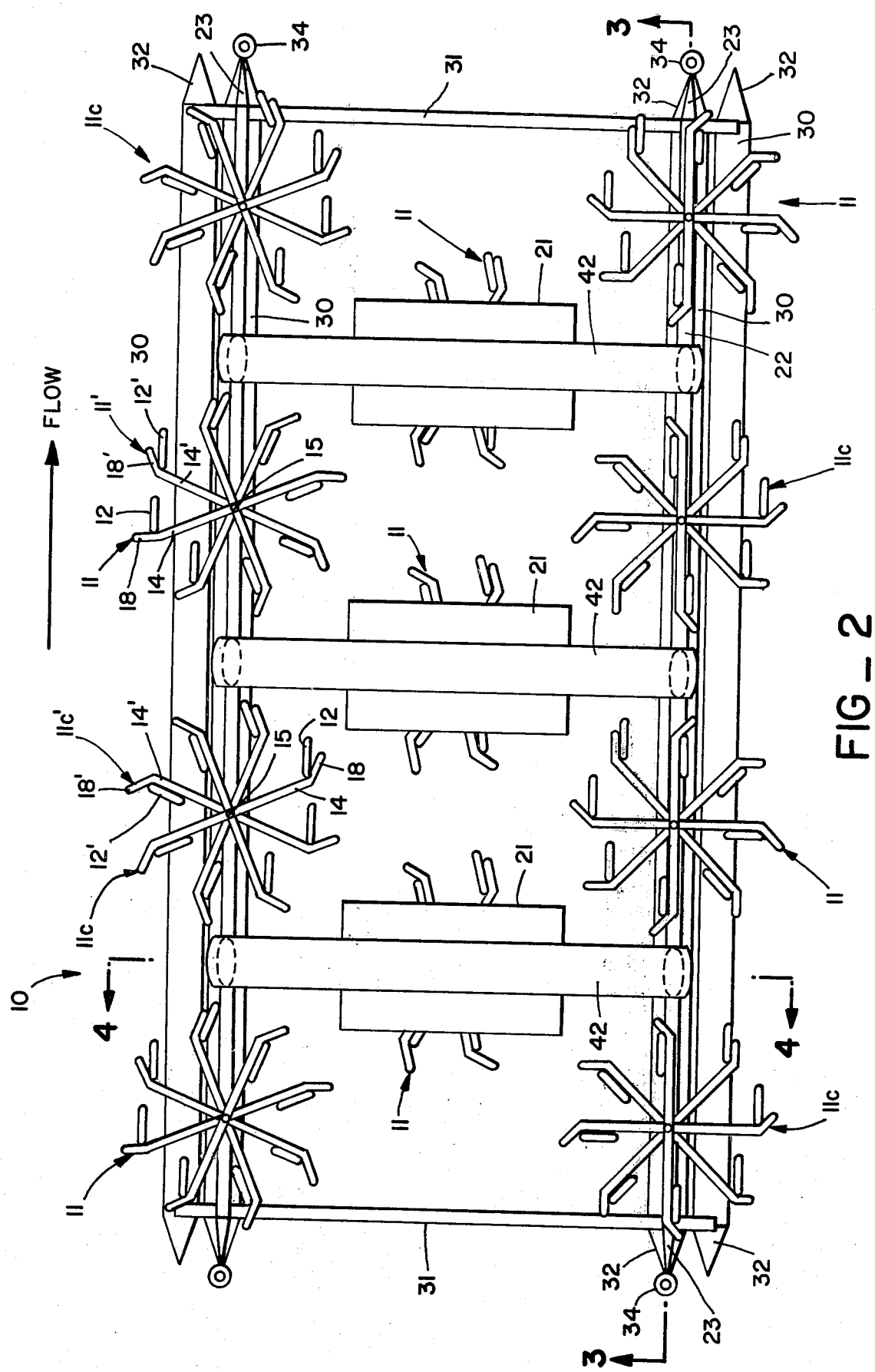
FIG_2

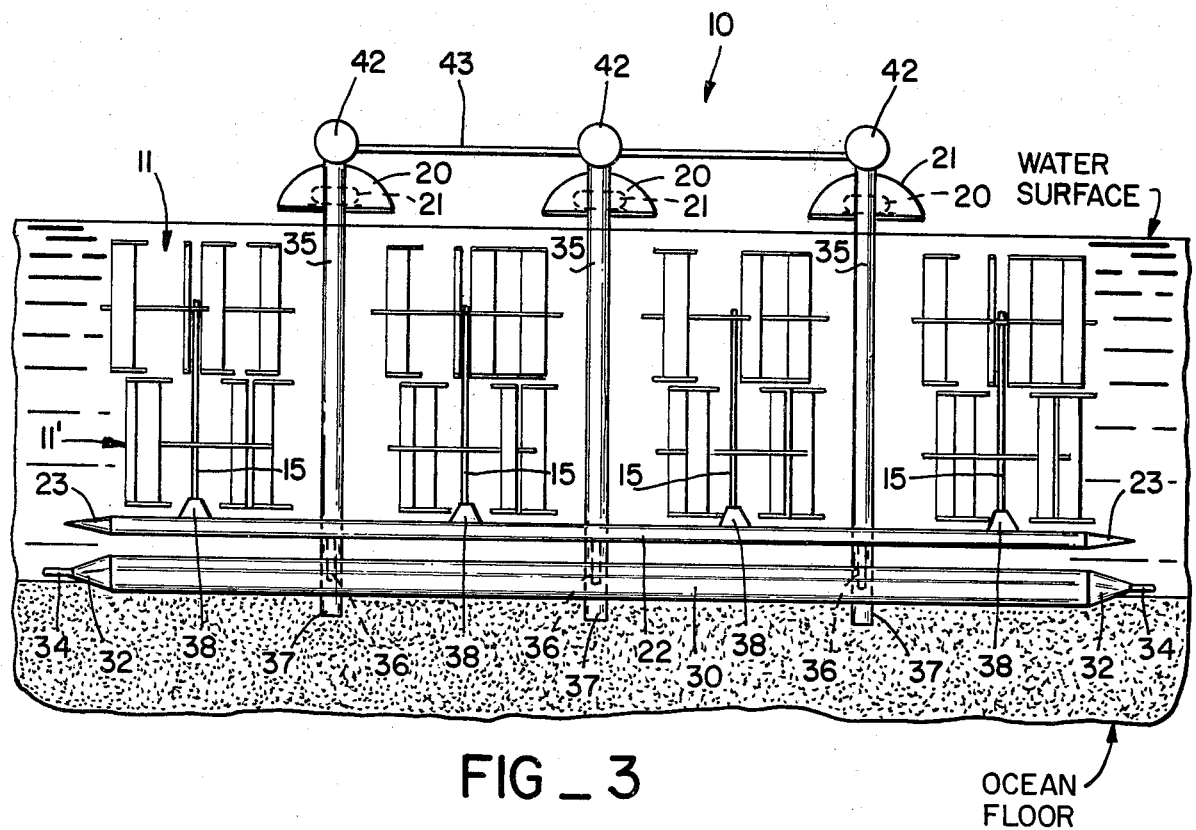
FIG_3
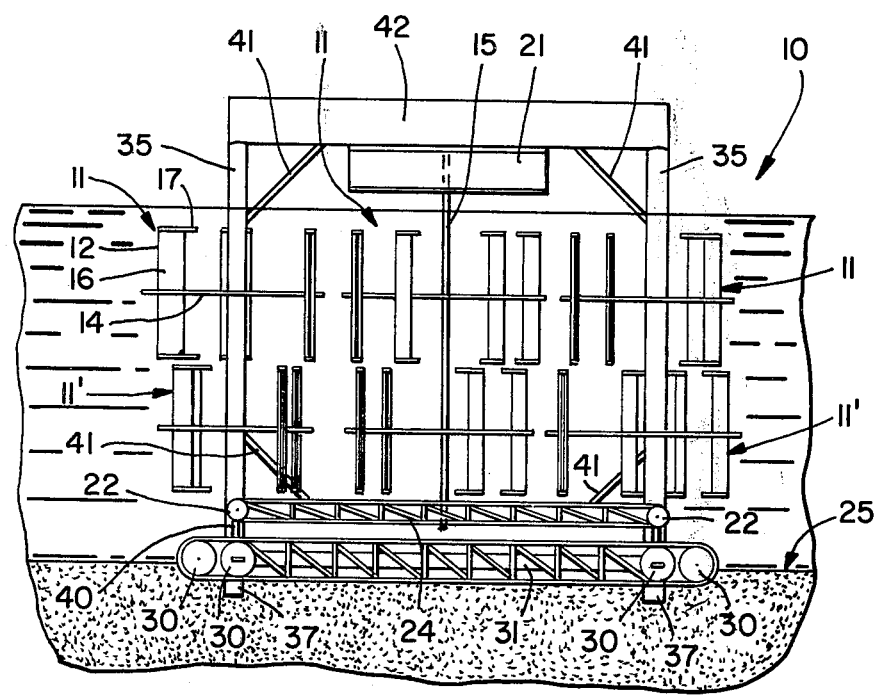
FIG_4

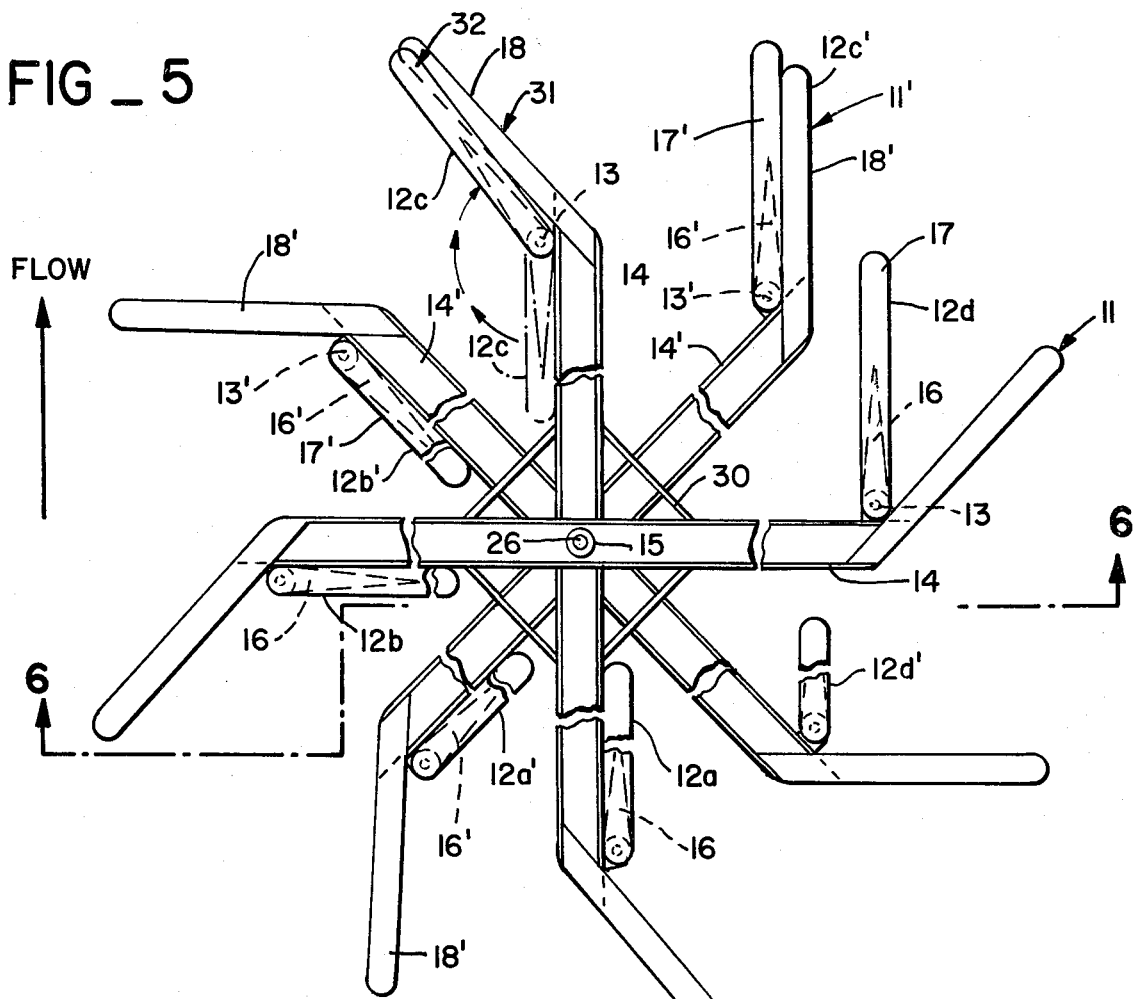
FIG_5
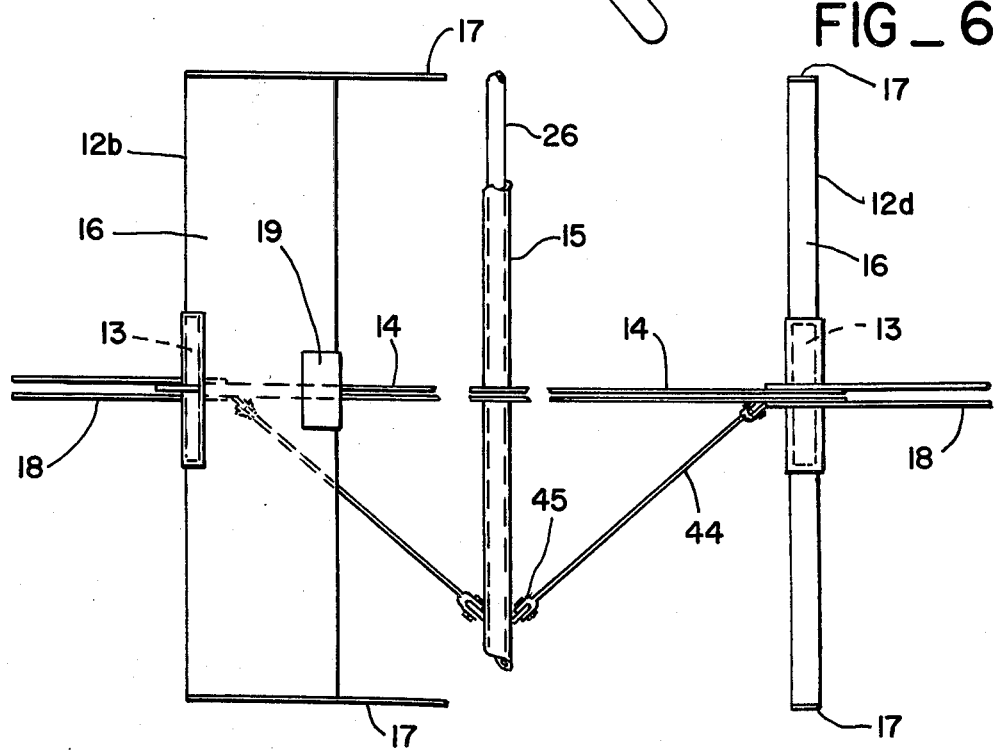
FIG_6

POWER GENERATOR

This invention relates to power generator apparatus for harnessing practical quantities of usable energy from water movement such as submarine or "deep-sea" ocean currents, tidal flows, channel currents, and the like.

In an age of ever increasing power demands coupled with diminishing energy supplies from both fossil fuels and inland water flows, it will become necessary to utilize energy sources which in the past have been discounted as being uneconomical under existing technology. In this reference, a vast amount of energy is present in the constantly moving masses of ocean water which encircle three quarters of the earth. The obstacles which have hindered development of this energy source include not only the problem of developing an apparatus of adequately large size to convert the kinetic energy of water motion to a usable form of power such as electricity, but even more importantly include the problems of building a structure massive enough to harness this power in practical quantities as well as the problem of positioning such an immense-sized structure in place for operation on an ocean floor.

The state of the art has advanced to the point at which underwater generators have been constructed to supply relatively limited amounts of power many orders of magnitude less than that required to accommodate even a small city. In this connection, reference is made to U.S. Pat. No. 3,604,942 issued in 1971 to Curtis A. Nelson that describes a generator device intended for installation on a concrete base along a river bottom. The device comprises a plurality of radially extending arms attached to the rotor of a sealed electric generator, and each arm pivotally carries a paddle having a geometry enabling it to be opened when moving with water current and to be closed when moving against water current.

It is apparent that for such a device to harness a sufficient quantity of energy from the ocean to compete with conventional hydroelectric or oil burning power plants would require either that the paddle dimensions be on the order of hundreds of feet in length or else that there be installed a multitude of smaller sized units in a bank extending across the path of an ocean stream. The latter solution of providing a multitude of small generators is limited in its practicality due to the complexity of operating and servicing such an array of equipment spread out over a large section of the ocean floor.

On the other hand, consolidation of such small generators into a relatively few mammoth-sized structures not only would improve the economics of maintenance and operation but also would yield an additional beneficial result which is less obvious. That is to say, aside from the expected proportionate increases in output power concurrent with increase in generator size, the use of immense-sized impeller blades having dimensions of the order of hundreds of feet has the effect of reducing energy loss caused by obstruction-induced turbulence because the water tends to flow through a large apparatus in undisturbed segments, each traveling as an integral unit, with turbulence occurring only at the small number of interfaces of the relatively few segments rather than at the large number of locations caused by the flow being chopped up into a multiplicity of nonhomogeneous, multidirectional, counter-opposing smaller currents.

In view of the foregoing, an object of the present invention is to provide an improved device for converting the power of ocean currents and the like into a more usable power such as electricity. Another object of the invention is to provide such a device which can realistically be constructed to have a size of the order of hundreds of feet or larger so as to take advantage of the greater efficiency and power output associated with larger size. A further object is in the provision of means for transporting, anchoring and leveling such structures which are too large in size to be handled by conventional means. While the broad concept of using rotating paddles to derive energy from water currents is not of itself new, it is an object of the present invention to improve the efficiency of conventional paddle turbine structures.

Additional objects and advantages of the invention, especially as concerns particular features and characteristics thereof, will become apparent as the specification continues.

An embodiment of the invention is illustrated in the accompanying drawings, in which:

FIG. 1 is a broken perspective view with components removed of a cluster of rotor-impeller units which collectively comprise a power generator apparatus embodying the present invention, the direction of water flow or current being in the direction of arrow X;

FIG. 2 is a top plan view of the power plant of FIG. 1;

FIG. 3 is a longitudinal sectional view of the power plant, the view being taken generally along the plane 3—3 of FIG. 2;

FIG. 4 is a transverse sectional view of the power plant, the view being taken generally along the plane 4—4 of FIG. 2;

FIG. 5 is an enlarged top plan view of a single impeller-rotor unit showing in detail the positioning of the impeller blades; and FIG. 6 is a transverse sectional view taken along the plane 6—6 of FIG. 5.

Apparatus embodying the present invention is operative to convert the energy of tidal currents and the like into a more usable form of energy such as electricity. Although embodiments of the apparatus may be placed along the bottoms of river channels and in similar environments in which generally unidirectional water currents are present, it is especially useful because of its large permissible size in association with tidal currents which constitute a considerably greater volume of water than river flows and, hence, provide a greater potential for large scale power production. The embodiment of the apparatus illustrated in the drawings is particularly suited for converting tidal flows into electric energy, and is therefore adapted to be located along the ocean floor.

The apparatus is denoted in its entirety with the numeral 10, and it includes a plurality of rotor assemblies 11 arranged in longitudinally extending rows that are transversely spaced, and each row of which constitutes a plurality of vertical tiers. In the specific form of the invention being considered, the longitudinally extending rows are disposed along the longitudinal edge portions of the apparatus and along the longitudinal center thereof, and each row comprises two tiers. In number, each longitudinal row comprises four separate rotor assemblies 11 along each longitudinal edge portion of the apparatus, and three rotor assemblies along the center row thereof. Thus, each tier includes eleven rotor assemblies, thereby providing a total of 22 rotor assemblies 11 in the apparatus 10. It may be observed that the rotor assemblies 11 in each tier are vertically aligned and function in unison to derive torque from the tidal flows.

The rotor assemblies 11 are substantially identical and, for this reason, no numerical differentiation has been made thereamong in the drawings. Accordingly, it will be evident that a detailed description of one such assembly 11 will apply equally to the others. Nevertheless, certain of the rotor assemblies are intended to rotate in angular directions counter to those of the other rotor assemblies so as to have counterbalancing reactive torque applications to the apparatus 10. In FIG. 2, those rotor assemblies which are intended to rotate in angular opposition to the others are disposed along the longitudinal edge portions of the apparatus 10 and, for purposes of differentiation, such rotor assemblies have the suffix c added to their numerical identification. It will be appreciated that there are four such assemblies (two in each tier) along each side of the apparatus 10. It should be emphasized that the direction of rotation for any rotor assembly 11 remains constant irrespective of the direction of tidal flow so that any rotor assembly will be displaced angularly in the same direction irrespective of a flow reversal in the direction of movement of the tidal flow acting on such rotor assemblies.

Each rotor assembly 11 includes a plurality of impeller blade structures 12 pivotally interconnected by means of a hinge or pivot pin 13 to a radially extending spoke 14 that projects outwardly from a center shaft 15 that defines the axis of rotation for the rotor assembly, all as is shown best in FIGS. 5 and 6. In the particular embodiment of the invention being considered, and as illustrated clearly in FIGS. 2 and 5, each rotor assembly 11 has a plurality of impeller blade structures 12 and respectively associated spokes 14, and such blade structures and spokes aggregate four in number and they are spaced apart angularly by equal distances of 90°. FIG. 5 illustrates two tiers of rotor assemblies, and shows that the blade-and-spoke structures of two vertically juxtaposed rotor assemblies may be angularly offset from each other by 45°, the components of the lower rotor assembly are depicted with the primed form of the same numerals for purposes of differentiation.

Referring to FIG. 6, it is most evident that each blade structure 12 includes a vertically disposed blade or sail 16 that extends both above and below the associated spoke 14 and is pivotally secured thereto by the pin 13 adjacent the center portion of the sail. Adjacent its top and bottom edges, the sails 16 are equipped with relatively heavy counterweights 17 that may project beyond the free vertical edge portion of the sail, and such counterweights are effective to maximize momentum transfer and torque development in application to the rotor shaft 15, as will be explained in detail hereinafter.

Each blade or sail 16 may be tapered in horizontal cross section as is shown clearly in FIG. 5 so as to minimize turbulence in the movement of water therepast. Concerning interruption in pivotal movement of the blade 16 about the pivot pin 13 associated therewith, the blade is adapted to have its extreme angular positions respectively defined by abutment in one direction with the radial spoke 14 associated therewith or by abutment in the opposite direction with a stop or abutment section 18 carried by each spoke adjacent the outer end thereof and disposed at an angular orientation relative to the radial axis of the spoke. The angular orientation of the abutment section 18 of each spoke may vary depending upon particular flow conditions, and a specific example that may be used is of the order of 45°.

Each blade 16 is equipped along the free vertical edge thereof in alignment with the associated spoke 14 with a bumper or reinforcing section 19 adapted to alternately engage the spoke 14 and its abutment section 18 to establish the extreme pivotal displacements of each blade 16 in opposite angular directions about its associated pivot axis 13. These extreme positions are shown in FIG. 5 in which the blade structures 12a and 12b are disposed in their innermost positions in abutment with the respectively associated spokes 14, and by the blade structure 12c which is in its outer extreme position in abutment with the angular extension 18 of the associated spoke 14. Blade positions intermediate these two extremes are assumed in certain angular positions of the rotor 11, as is depicted by the blade structure 12d.

As shown best in FIG. 6, each of the rotor shafts 15 is a hollow tubular component fixedly secured to the radially extending spokes 14 so as to be rotatably driven by power derived from the respectively associated rotor assemblies 11. Referring to FIG. 1, it will be seen that the various rotor shafts 15 are mechanically interconnected via conventional shaft and gear mechanism so that the combined power outputs thereof are used to drive electrical generators 20 (FIG. 3) respectively located in relatively large housing structures 21 which may be located above the water level, although such disposition of the generators and housing structures is not essential. The rotor assembly shafts 15 extend upwardly from supports therefor in the nature of elongated, longitudinally extending casings 22, one on each side of the apparatus 10, and which casings are hollow components. At their ends, the casings 22 may be equipped with generally cone-shaped end caps 23, as is shown best in FIG. 1. Adjacent their ends, the hollow casings 22 are rigidly interconnected by transversely extending girders 24 fixedly related to each casing and providing a network of bracing that facilitates relatively free movement of water therethrough. Also extending transversely between the longitudinal casings 22 intermediate the girders 24 are hollow transverse casings 25 that are welded or otherwise sealingly secured to the longitudinal casings 22 so as to establish communication with the hollow interiors thereof.

A network of power transmission shafts is disposed within the hollow casings 22 and 25, and the function of such transmission shafts is to transmit torque developed by the rotor shafts 15 to a plurality of generator input drive shafts 26 respectively connected with the generators 20 to drive the same. In the configuration shown, the generator input or drive shafts 26 extend through the center rotor assembly shafts 15 and are, therefore, coaxially related thereto. Both the generator input shafts 26 and center rotor shafts 15 are supported by and extend into the hollow transverse casings 25 and are drivingly interconnected with transverse drive shaft components 27 located within the casings 25. The longitudinally extending casing structures 22 are respectively equipped with shaft sections 28 that are drivingly engaged by the respectively associated rotor shafts 15, and in turn drivingly engage the transverse shaft sections 27.

Accordingly, angular displacements of the rotor assemblies 11 will impart rotation to the shafts 15 which rotatably drive the respective transmission shafts 28 and 27 (the latter also receiving torque from the center rotor shafts 15), and the shafts 27 drive the respectively associated generator input shafts 28 to drive the generators 20 and thereby produce electrical energy from the tidal current flow imparting rotation to the rotor assemblies. It will be apparent that conventional gear-meshing systems may be employed to interconnect the various shafts 15 and transmission shafts 27 and 28 as, for example, standard bevel gears. Unidirectional clutching mechanisms may also be employed so that power is transmitted only from the rotor assemblies 11 to the various transmission shafts 27 and 28 but not in the reverse direction, thereby tending to accommodate many differences in the power developed by the various rotor assemblies.

The apparatus 10 further includes a base or foundation structure providing the support for the clusters of rotor assemblies 11, and in the particular form of the apparatus being considered, such base performs a dual function of providing buoyancy that enables the apparatus to be floated to its point of installation, and then provides the means for supporting the apparatus in position along the ocean floor or other submarine surface. Referring particularly to FIGS. 1 and 3, the base or foundation 29 includes a plurality of elongated, longitudinally extending pontoons 30, there being four such pontoons arranged in essentially side-by-side pairs disposed along the longitudinal edge portions of the apparatus and defining such edge portions thereof. The pontoons 30 are rigidly interconnected by a plurality of transversely extending and longitudinally spaced girders 31 that are strapped or otherwise affixed to the pontoons and constitute an open truss network that permits relatively free flow of water therethrough. The pontoons 30 at the ends thereof may be equipped with cone-shaped ends 32 that may be filled with concrete or otherwise weighted to provide ballast for the apparatus. Depending fins 33 along the end portion 32 also serve to stabilize the apparatus 10 during flotation thereof from one location to another.

As respects movement of the apparatus 10 to its place of use, the innermost pontoons 30 are equipped at the ends 32 thereof with connectors 34 to enable towlines to be fastened to the apparatus. The connectors 34 may take any standard and conventional form, and those illustrated in the drawings are closed loops or eyes that enable towline hooks to be releasably secured thereto.

Any conventional arrangement may be used to fill the pontoons 30 with water for purposes of submerging the apparatus 10, and for removing water from the pontoons for flotation purposes either during transport from one location to another, or simply to elevate the apparatus for inspection and/or repair after it has been in operation. For example, the pontoons 30 may be equipped with flood valves and vents that can be opened to permit the pontoons to fill with water, or they can be open along the bottoms thereof and equipped with valve-controlled vents so that the vents are opened to permit water to enter the pontoons whenever it is desired to submerge the apparatus. Air and water-pumping systems are also required in functional association with the pontoons 30 in order to remove water therefrom and replace the same with air whenever it is desirable to refloat the apparatus. Such systems, and the mechanism for controlling the vent valves may be located in the housings 21 that contain the generator equipment 20, and such systems may communicate with the pontoons 30 via relatively large tubular columns 35 that connect with the pontoons at their lower ends and extend vertically upwardly therefrom. As previously stated, all of the water-expulsion and vent mechanism may be located within the casings 21, and since pump, valve-controlled vents, and air-supply systems are old and well known, they are not specifically shown in the drawings.

There is great likelihood that an underwater surface, especially one subjected to tidal flows, will not be flat and uniform. The apparatus 10 includes a means for leveling the same on an uneven ocean floor or the like so that the maximum energy can be derived from the tidal flows by the clusters of rotor assemblies 11. Although various arrangements may be included for leveling purposes, the apparatus 10 employs hydraulically adjustable leveling shafts 36 that may be adjusted in vertical directions as necessary to level the apparatus 10. In some instances, the submarine surface will be soft and muddy, and in this instance, it may be desirable to anchor the apparatus 10 firmly thereto by means of reducing the pressure at certain locations along the pontoons 30 at which they engage such surface. This may be accomplished by a plurality of hollow anchor spuds 37 connected with vacuum pumps via the columns 35, and which pumps are located within the aforementioned casings 21. Vacuum pumps and their operation are well known and need not be illustrated and described. it will be apparent in FIG. 1 that the hollow anchor spuds 37 are respectively coaxially circumjacent the leveling shafts 36, wherefore both are in general vertical alignment with the columns 35, but are not necessarily so aligned.

The apparatus 10 will be equipped with myriad braces and other support components to maintain the apparatus in the configuration illustrated and to reinforce the same so as to withstand any buffeting and other disturbances to which it may be subjected when in actual use. For the most part, such bracing and reinforcing has been obviated for purposes of simplifying the rather already-complex illustrations. The completeness of the disclosure is not neglected, however, since structural components of the type referred to are standard items with their structural characteristics and function both conventional and well understood. In FIG. 3, the interconnection of the various rotor assembly shafts 15 with the elongated casing 22 is shown to be effected through frusto-conical bosses 38. In FIG. 1, the rotor assembly shafts 15 are shown to be reinforced and journalled for rotation intermediate the ends thereof in longitudinally extending supports 39, one on each side of the apparatus. In FIG. 4, the casing 22 along each side of the apparatus 10 is shown to be supported above the associated pontoon 30 via a plurality of short columns 40. Also in this figure, a plurality of angularly disposed braces 41 are interconnected with the hollow columns 35 to stabilize the same adjacent the lower ends thereof. The columns 35 are similarly connected adjacent their upper ends by braces 41 to an associated horizontally disposed, transversely extending cylindrical tank 42 respectively disposed above the casings 21. A walkway or bracing network 43 (FIG. 3) extends between the tanks 42 and both reinforces and stabilizes the same.

The combinative support and tank structure 42 may be used to store water during maximum tidal-flow conditions so that the water can be withdrawn therefrom and used to energize conventional water turbines (not shown) during slack or low periods of tidal motion. The turbines, it will be apparent, will be drivingly interconnected with the generators 20 so as to energize the same when the turbines are in operation.

The apparatus 10, although susceptible to being constructed in various sizes, it lends itself especially well to massive structures effective because of the size thereof to convert relatively low velocity tidal flows into large quantities of electrical energy. By way of illustration, the transverse dimension of the apparatus 10 from centerline to centerline of the cylindrical casings 22 may be of the order of 260 feet. As is apparent in FIG. 2, the outer rotor assemblies 11 overhang the casings 22, and each rotor assembly may have a diameter exclusive of the angularly turned abutment sections 18 of the order of 100 feet. Each blade 16 may be approximately 2 feet thick at its widest, pin-equipped edge, and it may extend therefrom for a distance approximating 20 feet. The vertical dimension of such blade from counterweight 17 to counterweight 17 may be of the order of 75 feet, thereby making the vertical height of the apparatus 10 well in excess of 150 feet. The counterweights 17 may project beyond the free edge of each blade 16 by some 10 feet, thereby making the horizontal length or longitudinal dimension of each counterweight approximately 30 feet. In terms of weight, a typical counterweight system employing top and bottom counterweights each approximately 2 feet in width, 3 inches in thickness, and 30 feet in length would provide a weight of the order of 2,400 pounds for each blade 16.

By way of further example, the driving force area or area of force application for each blade 16 may be of the order of 1,500 square feet, the blade may have a total weight including the counterweight 17 of approximately 40,000 pounds, and each radial spoke 14 having a radius of approximately 50 feet may weigh about 25,000 pounds. Thus, a single rotor assembly or propulsion unit 11 might have a total weight of the order of 300 tons. Because of their construction, however, the apparatus 10 will generally be a neutral floating apparatus as are the various components thereof, wherefore such components are in flotation equilibrium thereby obviating the development of great stresses because of the massive size and great weight of the apparatus. Assuming a tidal flow having an average velocity of approximately 4 miles per hour, and further assuming that driving torque is applied by such tidal flow to each blade 16 throughout an angular displacement of the rotor shaft 15 of the order of 220°, a single propulsion unit having a developed RPM at the rotor shaft 15 of approximately 5 would produce of the order of 15,000 horsepower. Since gear and shaft drive trains are very efficient, substantially all of such horsepower output of each propulsion unit can be delivered to the generators 20 to drive the same and thereby develop the equivalent in electrical energy. The foregoing examples are given by way of illustration and are not intended to recite specific objectives or requirements, the environmental conditions of any particular installation being determinative of both the size of the apparatus, number of rotor clusters, rotational velocities, etc.

The concept of neutral flotation of the massive components described is effected by relating water displacement to the size of the particular component being considered. For example, each blade 16 may have a laminated construction constituting a light-weight core covered by a metal skin. In this respect, in a typical construction the outer skin of each sail or blade 16 may be a thin sheet of 5-pound Corten Steel encapsulating a foam plastic material such as polyurethane. In any case, the neutral flotation characteristics of the blades 16 and associated components of the apparatus results in maximizing the energy developed from the water currents by minimizing if not eliminating gravitational forces tending to oppose productive energy development. It will be understood that the entire apparatus 10 can be covered with a coating material including certain of the synthetic plastics to protect the metal from electrolysis and marine growth, barnacles for example.

As previously mentioned, the components of the apparatus may all be streamlined so as to provide the least resistance to free movement of water therepast in either direction. Thus, the various girders 24 and 31 are open truss networks, and the spokes 14 and angular extensions 18 thereof are flat, spaced apart elements enabling water to flow therebetween and offering very little blunt surface area opposing current flow. Providing surfaces that are substantially normal (rather than angularly disposed) to the axis of water movement also tends to minimize resistance, as is shown in FIG. 6, the various spokes 14 may be connected to the shaft 15 associated therewith by means of tension cables 44 equipped with turnbuckles 45 at the ends thereof to enable the spokes 14 to be adjusted into a horizontal orientation in which they are substantially normal to the vertical axis of the associated rotor shaft 15. The jacks or hydraulic levelers 36 enable the entire rotor-assembly composition including the casings 22 to be leveled accurately irrespective of the disposition enforced on the base structure 29 because of the character of the subterranean floor.

Although the apparatus 10 will function when placed in a water current substantially independently of the direction in which the current flows relative to the apparatus, the best results are obtained when the transverse planes of the girders 24 and 31 are arranged so as to be substantially normal to the axis of water flow. In such disposition of the apparatus, all resistance to movement of water therepast in either longitudinal direction is essentially at a minimum.

Assuming such disposition and orientation of the apparatus 10, the movement of water, although reversible in a tidal flow, may be taken for descriptive purposes to be in the direction of the arrow denoted with the legend "Flow" in FIGS. 1, 2, and 5. It may also be taken that the apparatus 10 is substantially submerged, as shown in FIGS. 3 and 4, with the pontoons 30 seated upon the ocean floor, and the rotor assemblies 11 being entirely covered by the water surface. The casings 21, tanks 42, and support network 43 may be disposed above the water surface, although in certain environments this would be undesirable as a hazard to navigation and also because of the danger it could create concerning damage to the apparatus itself.

Taking as the initial condition of a rotor assembly the relative disposition of the components as shown in FIG. 5, the upper spokes 14 of the rotor assembly 11 intersect at the shaft 15 and are substantially normal to each other. Thus, these two sets of spokes respectively lie along the X- and Y-axes of the usual cartesian coordinate system. Taking for descriptive convenience the spoke 14 extending along the Y-axis and considering first the blade structure 12a, the centerline of the blade 16 substantially parallels the radial axis of the spoke 14 and essentially no torque is developed by the blade structure 12a against the spoke 14 because the flow of water along both sides of the blade 16 is essentially equal. Assume that for some reason the assembly 11 rotates slightly in a clockwise direction about the vertical axis of the shaft 15 so that the spoke 14 now lying along the Y-axis is offset therefrom and is angularly disposed relative to the direction of water flow. The trailing surface of the blade 16 of the structure 12a will then present a small projected surface area to the water flow which will impinge thereagainst and press the blade 16 into tight abutment with the spoke 14. Thus, a component of the force developed against the trailing surface of the blade structure 12a will be essentially normal to the radial axis of the spoke 14 and develop a torque at the shaft 15 (the lever arm length is enormous) enforcing rotation on the rotor assembly 11 in the clockwise direction.

As the rotor assembly 11 continues to be displaced angularly, the effective area of the blade structure acted on by the moving water to produce torque at the shaft 15 progressively increases through the position shown by the blade structure 12a' of the rotor assembly 11' until the area is maximized and becomes, substantially, the entire area of the trailing face of the blade structure when the blade structure has been displaced through 90° and into the position depicted by the blade structure 12b in FIG. 5. Thereafter, the effective area of the blade structure progressively decreases through the position illustrated by the blade structure 12b' until the blade structure is in the broken-line position of the blade structure 12c in FIG. 5. At this moment, the torque developed by water impingement on the blade structure 12c is negligible because the flow is substantially equal on each side of the blade.

However, this substantially no-torque condition is of very short duration because as soon as the spoke 14 has been displaced in a clockwise direction slightly beyond the 180° position, the opposite side of the blade structure then becomes more exposed to the flow of water, thereby causing the blade to be displaced rapidly into its opposite extreme position of abutment with the angular extension 18, as shown by the full-line position of the blade structure 12c. The new trailing surface of the blade structure 12c now presents an effective area against which the moving water impinges to develop a force having a vector component operative to impart torque to the shaft 15. This condition obtains with the effective area of the blade structure progressively decreasing until the blade structure is in the approximate position of the blade structure 12c' of the rotor assembly 11' in FIG. 5. At this time, the blade structure assumes and remains in a position of substantial alignment with the flow axis of the water, the blade structure remains in such free-trailing position by pivoting about the axis 13 as the associated spoke continues to be displaced angularly until it returns to its starting position shown by the blade structure 12 a in FIG. 5. At this time, a complete cycle of operation has been completed and the described sequence is repeated for as long as the water flows relative to the rotor assembly. Thus, a positive torque is developed by water action against each blade structure for approximately 220°. Accordingly, with a rotor assembly having four spokes 14 such as the assembly 11 shown in FIG. 5, one blade structure (12b) has maximum torque being developed thereagainst at the same time that substantial torque is still being developed against another blade (12c), and still another blade (12a) is in a position at which torque development thereagainst is initiating and will be effective before no torque is developed against the blade 12c. Evidently, then, there is only one blade (12d) that does not have torque developed thereagainst at this condition of the rotor assembly 11, and it is only for a very brief interval that any two blade structures of the rotor assembly 11 will be in angular positions in which no torque is developed thereagainst.

In addition, however, the described torque development operative against the rotor shaft 15 to effect angular displacement thereof is supplemented by a momentum or impact force delivered by each blade structure to the associated angularly disposed section 18 of the spoke 14 to which the blade structure is pivotally supported. More particularly in this respect, and referring especially to the blade structure 12c in both the full-line and broken-line positions thereof illustrated in FIG. 5, as the blade structure 12c is displaced in a clockwise direction about its pivot axis 13 by water action thereon, as previously explained, it is progressively accelerated because of the increasing area of the surface of the blade structure against which the flowing water impinges until the maximum-torque position in which the blade structure is normal to the flow axis of the water, thereafter, the rate of acceleration of the blade toward impact with the angular offset 18 of the rotor may diminish, but the blade structure because of its great weight contains substantial kinetic energy which is not dissipated until impact with the extension 18 at which time at least a part of that energy is transmitted to the section 18 by impact thereagainst, and any residual kinetic energy remains in the blade structure and thereby tends to accelerate the angular displacement of the associated spoke 14 because of the blade structure being in abutment with the extension 18. Thus, substantially all of the available kinetic energy in the blade structure 12c because of its being displaced from one extreme position into another is transferred to the associated spoke 14 and, therefore, to the shaft 15 as torque tending to rotate the same. It will be apparent that not only does each blade structure operate to provide a positive torque on the rotor 15 for substantially 220°, but it also contributes an additional torque increment resulting from the transmission of kinetic energy to the extension 18 whenever the blade structure is displaced from the inner extreme position illustrated by the broken-line position of the blade structure 12c in FIG. 5 into the outer extreme position shown by the full-line position of the blade structure 12c in FIG. 5.

Each rotor assembly 11 may have more or less than four spokes 14 and blade structures associated therewith, and physical parameters and environmental conditions may determine factors of this type. In FIG. 5, and elsewhere in the drawings, it is apparent that the tiered or vertically aligned rotor assemblies 11 and 11' are angularly offset from each other by 45° which is not essential but has the advantage of developing a more uniform torque at the rotor shaft 15 since both such rotor assemblies impart torque to the same or common shaft. Such offset may also have the advantage of reducing turbulence in the water flow through the apparatus which contributes to maximum conversion of the kinetic energy in the flowing water into electrical energy at the generators 20. It is believed clear without explanation that if the angular extensions 18 were disposed in the opposite direction to that shown in FIG. 5 and the blade structures correspondingly positioned along the opposite sides of the respectively associated spoke 14 (i.e., turn the assemblies 11 and 11' upside down from the FIG. 5 position thereof), then the described function would still obtain except that the rotor assemblies would be angularly displaced in a counterclockwise direction relative to the axis of the shaft 15. It is also believed apparent without explanation that should the direction of water flow be reversed from that shown in FIG. 5 the rotor assemblies 11 and 11' would still rotate in the same direction (clockwise), the only difference being that the force development would be through the +X, +Y and +X, −Y quadrants of the previously described coordinate system rather than through the −X, −Y and −X, +Y quadrants in accordance with the foregoing description.

In this same reference, it makes substantially no difference in what direction the water flows relative to the assemblies 11 and 11' because the cyclic positioning of the blade structures 12 will remain the same, and the described cartesian coordinate system can be disposed so that X-axis is normal to the flow axis of the water irrespective of the direction of the flow. Thereafter, all of the described functions will be precisely the same. Orienting the apparatus 10 so that the girders 24 and 31 are normal to the flow direction is advantageous, as previously explained.

While in the foregoing specification an embodiment of the invention has been set forth in considerable detail for purposes of making a complete disclosure thereof, it will be apparent to those skilled in the art that numerous changes may be made in such details without departing from the spirit and principles of the invention.

What is claimed is:
1. A submersible power generator comprising:
  a. rotatable shaft;
  b. plurality of radially disposed spokes carried by said shaft so as to rotate therewith;
  c. plurality of impeller blades hingedly attached to said spokes for movement relative thereto and operable to intersect the water current and be impinged thereby and move therewith to impart torque to said shaft when disposed on one side thereof and to trail freely while moving generally against the water current on the other side of said shaft to develop relatively little resistance to water flow therepast and to impart relatively little torque to said shaft; and
  d. stop mechanism provided by each spoke for positioning the associated blade at an angle to the radial axis of said spoke, and said spoke providing an abutment for positioning the associated blade at an angle to the radial axis of said spoke, said stop mechanism and abutment effective to cause the blade to provide a current flow impingement surface after the spoke has moved into alignment with the axis of water flow, said blade movable between said stop mechanism and said spoke during the portion of said blade's travel in a direction generally with the current, said stop mechanism developing a force aiding rotation of said shaft during the initial portion of said blade's travel in a direction generally against the current.

2. The power generator of claim 1 in each of which said impeller blades is hingedly attached to its spoke adjacent the radial extremity thereof and said stop mechanism extends angularly outwardly therefrom; each of said blades bearing against its associated spoke while moving with the water current and upon reaching the end of its downstream travel pivots outwardly from the spoke and into abutment with said stop mechanisms, thereby causing the water current to act favorably against said blades during the initial portion of their upstream travel as aforesaid.

3. The power generator of claim 2 in which said stop mechanisms extend outwardly at an angle of the order of 45°.

4. The power generator of claim 3 in which said impeller blades are weighed to increase the mass thereof; a substantial portion of said mass being concentrated away from the hinged edge of said blades to enhance the momentum transfer effected by the action of said blades in abutting said stop mechanisms adjacent the end of the downstream travel of said spokes.

5. The power generator of claim 2 in which the weight-displacement ratio of each blade is selected to provide a generally neutral floating structure.

6. The power generator of claim 1 in which each of said shafts is equipped with a plurality of spokes and blades disposed in at least two vertically disposed tiers, the spokes of one tier being angularly offset from the spokes of an underlying tier.

7. The power generator of claim 1 in which both of said rotatable shafts are provided and a common foundation structure carrying the same; said blades and spokes of adjacent shafts being inversely disposed, thereby causing adjacent shafts to rotate in counteropposed directions.

8. The power generator of claim 7 and further comprising hollow pontoon structure adapted to be flooded for sinking said power generator into position on an ocean floor and adapted to be evacuated to provide temporary flotation for said power generator.

9. The power generator of claim 8 in which said foundation structure is equipped with vertically adjustable braces operable to level said foundation structure relative to said pontoon structure to accommodate nonhorizontal sections of ocean floor.

10. The power generator of claim 9 in which said pontoon structure is equipped with anchor piles attached thereto and extending downwardly therefrom and being open at the bottom to enable suction to be applied to a subterranean surface.

11. The power generator of claim 10 in which each of said shafts is equipped with a plurality of spokes and blades disposed in at least two vertically disposed tiers, the spokes of one tier being angularly offset from the spokes of an underlying tier.

12. The power generator of claim 11 and further having water storage vessels positioned above said tiers of spokes and blades and having also auxiliary power turbines; said tanks having pumping means for storage of water during periods of peak power production and said tanks serving to supply water under a head pressure for powering said auxiliary power turbines during periods of slack water current.

* * * * *